(12) United States Patent
Patterson et al.

(10) Patent No.: US 6,267,896 B1
(45) Date of Patent: Jul. 31, 2001

(54) FERRATE-BASED WATER DISINFECTANT AND METHOD

(75) Inventors: James A. Patterson, Sarasota, FL (US); John A. Thompson, Nassau (BS); Charles Entenmann, Key Largo, FL (US)

(73) Assignee: EcoSafe LLC, Sarasota, FL (US)

( * ) Notice: Subject to any disclaimer, the term of this patent is extended or adjusted under 35 U.S.C. 154(b) by 0 days.

(21) Appl. No.: 09/543,945

(22) Filed: Apr. 6, 2000

(51) Int. Cl.$^7$ .......................................... C02F 1/72
(52) U.S. Cl. ........................ 210/758; 210/205; 422/28; 422/239; 422/277; 423/632; 423/641
(58) Field of Search ................. 210/758, 198.1, 210/205; 423/632, 641; 422/28, 239, 277

(56) References Cited

U.S. PATENT DOCUMENTS

| | | |
|---|---|---|
| 2,455,696 | 12/1948 | Mosesman . |
| 2,536,703 | 1/1951 | Schreyer . |
| 2,728,695 | 12/1955 | Harrison . |
| 2,758,090 | 8/1956 | Mills . |
| 2,835,553 | 5/1958 | Harrison . |
| 3,632,802 | 1/1972 | BeMiller . |
| 4,246,910 | 1/1981 | Rainer et al. . |
| 4,304,760 | 12/1981 | Mein et al. . |
| 4,385,045 | 5/1983 | Thompson . |
| 4,405,573 | 9/1983 | Deininger et al. . |
| 4,435,256 | 3/1984 | Deininger . |
| 4,435,257 | 3/1984 | Deininger et al. . |
| 4,500,499 | 2/1985 | Kaczur et al. . |
| 4,545,974 | 10/1985 | Thompson . |
| 4,551,326 | 11/1985 | Thompson . |
| 4,606,843 | 8/1986 | Deininger et al. . |
| 5,202,108 | 4/1993 | Deininger . |
| 5,217,584 | 6/1993 | Deininger . |
| 5,284,642 | 2/1994 | Evrard et al. . |
| 5,746,994 | 5/1998 | Johnson . |

*Primary Examiner*—David A. Simmons
*Assistant Examiner*—Betsey Morrison Hoey
(74) *Attorney, Agent, or Firm*—Charles J. Prescott

(57) ABSTRACT

A contaminated water disinfectant and method including a quantity of substantially dry soluble alkali metal ferrate (VI) particles. A porous sealed packet contains the particles in a quantity sufficient to disinfect a predetermined quantity of contaminated water by oxygenation. A quantity of substantially dry insoluble inert particles are also contained within said packet and are of sufficient weight to cause the packet to at least partially sink into the contaminated water. The packet is formed of a porous sheet material capable of passing oxygen and water therethrough while preventing undissolved ferrate and inert particles from passing from the packet and entering the water.

18 Claims, 1 Drawing Sheet

100
FERRATE-BASED WATER DISINFECTANT AND METHOD

BACKGROUND OF THE INVENTION

1. Scope of Invention

This invention relates generally to the use of ferrates of alkali metals for disinfecting contaminated water, and more particularly to a combination of such ferrates contained in dry particle form within a porous packet.

2. Prior Art

The utilization of ferrates as a catalytic agent has been exploited with respect to both novel uses and economy of manufacture. An early U.S. Pat. No. 2,455,696 to Moseman Fischer-Tropsch teaches catalysts that are prepared by reacting $Fe(OH)_3$ with an alkali metal hydroxide and an oxidizing agent to form alkali metal ferrate, after which a mixture of ferrate and powdered iron or iron oxide is heated in the presence of air.

Schreyer, in U.S. Pat. No. 2,536,703 teaches alkali metal ferrates prepared by oxidizing ferrate hydroxide in a strong caustic solution with chlorine gas for use as a deodorizing agent for caustic solutions. In U.S. Pat. No. 2,728,695, Harrison teaches the use of ferrites applied to metallic surfaces for corrosion protection. Mills, in U.S. Pat. No. 2,758,090 teaches the use of orthophosphates and metaphosphates to stabilize ferrates. The unique production of potassium ferrate is also disclosed. In another Harrison U.S. Pat. No. 2,835,553, an alkali metal carbonate is reacted with ferric oxide to yield an alkali metal ferrate (III). From that, an alkali metal ferrate (IV) and then ferrate (VI) are prepared.

BeMiller, in U.S. Pat. No. 3,632,802 teaches the use of alkali metal ferrates to oxidize starch and cellulose. Preparation of ferrates are shown by reacting potassium hydroxide, ferric nitrate and chlorine.

The use of ferrates by Rainer in U.S. Pat. No. 4,246,910 teaches an alkali earth metal ferrate form added to cigarette filters to remove hydrogen cyanide and ammonia. In U.S. Pat. No. 4,304,760, Mein has disclosed potassium ferrate (VI) and a process for removing potassium hydroxide from the crystallized potassium ferrate (VI). Thompson, a co-inventor herein, in U.S. Pat. No. 4,385,045, teaches a method of producing alkali metal ferrates by dry reactions at high temperatures either in a vacuum or in an inert gas atmosphere.

In the Deininger U.S. Pat. No. 4,405,573, the making of potassium ferrate by reacting pure potassium hydroxide, chlorine and a ferric salt in the presence of a ferrate-stabilizing compound is taught. Two additional Deininger U.S. Pat. Nos. 4,435,256 and 4,435,257 also disclose processes for preparing potassium ferrate (VI) by electrochemical methods.

Another of co-applicant Thompson's U.S. Pat. No. 4,535,974 provides further dry technique technology in producing alkali metal ferrates using hematite and magnetite at controlled elevated temperatures. U.S. Pat. No. 4,551,326 also invented by Thompson is a continuation of the previously referenced U.S. Pat. No. 4,385,045.

In two U.S. Pat. Nos. 4,500,499 and 4,606,843, Kaczur teaches the production of highly pure alkali metal or alkaline earth metal ferrates by an extraction process and by vacuum drying a crude ferrate cake of an alkali metal or alkaline earth metal ferrate with at least one alkali metal or alkaline or earth metal hydroxide followed by high temperature drying with heated $CO_2$ gas.

In another patent to Deininger, U.S. Pat. No. 4,983,306, a process for treating water to remove transuranic elements using an alkali or alkaline earth metal ferrate is there taught. A water soluble salt added to the alkaline earth ferrate is also taught to enhance removal efficiency. Deininger also reviews many prior art processes for the use of ferrate in U.S. Pat. No. 5,202,108 which generally teaches another process for producing ferrate utilizing beta-ferric oxide. Moreover, in U.S. Pat. No. 5,217,584, Deininger further teaches yet another process for producing ferrate employing beta-ferric oxide.

Stable ferrates having the formula $MFe,XO_4$ in which M is two atoms of either Na or K or one atom of Ca or Ba, X being selected from the group consisting of Al, Si, P, S, CL, Mo, Mn, Cr and mixtures thereof, are prepared by reacting MOH and an oxide with a compound of Fe and X.

Johnson, in U.S. Pat. No. 5,746,994 teaches ferrates which are produced by oxidizing $Fe^{3+}$ to $FeO_4^{2-}$ with monoperoxosulfate in the presence of KOH or NaOH. The availability of ferrates under the trademark TRUCLEAR by Analytical Development Corporation for water purification and waste water treatment are disclosed.

A significant limitation in the use of an alkali metal ferrate in dry or granular form is that, because it is substantially lighter than water, these particles will simply float atop the water to no avail in effecting decontamination thereof. Additionally, after chemically reacting with the water, a non-toxic residue is left in the water in the form of iron oxide particles and other inert impurities which increases the turbidity of the contaminated water and will not decompose thereafter. By the present invention, highly effective alkali metal ferrate (VI) particles, combined with predetermined amounts of an inert insoluble particle material such as clean, dry sand in a uniformly blended mixture with the alkali ferrate (VI) within a porous sealed packet overcome the above limitations in utilizing ferrates (VI) for water decontamination.

BRIEF SUMMARY OF THE INVENTION

This invention is directed to a contaminated water disinfectant and method including a quantity of substantially dry soluble alkali metal ferrate (VI) particles. A porous sealed packet contains the particles in a quantity sufficient to disinfect a predetermined quantity of contaminated water by oxygenation. A quantity of substantially dry insoluble inert particles are also contained within said packet and are of sufficient weight to cause the packet to at least partially sink into the contaminated water. The packet is formed of a porous sheet material capable of passing oxygen and water therethrough while preventing undissolved ferrate and inert particles from passing through the sides of the packet and entering the water.

It is therefore an object of this invention to provide an effective utilization of alkali metal ferrates (VI) in dry particle form for water decontamination and disinfectant.

It is another object of this invention to provide a porous packet for disinfecting contaminated water including dry particles of an alkali metal ferrate in combination with inert insoluble particles which cause the packet to sink within the contaminated water for heightened oxygen discharge decontaminating effectiveness.

It is still another object of this invention to provide, in combination, a dry mixture of alkali metal ferrate (VI), e.g. potassium ferrate, and dry beach sand within a porous packet, the combination having a density greater than that of the contaminated water so that the packet will sink to the bottom of the contaminated water to maximize the effective release of disinfecting quantities of oxygen from the packet.

In accordance with these and other objects which will become apparent hereinafter, the instant invention will now be described with reference to the accompanying drawings.

DETAILED DESCRIPTION OF THE INVENTION

Figure 1:
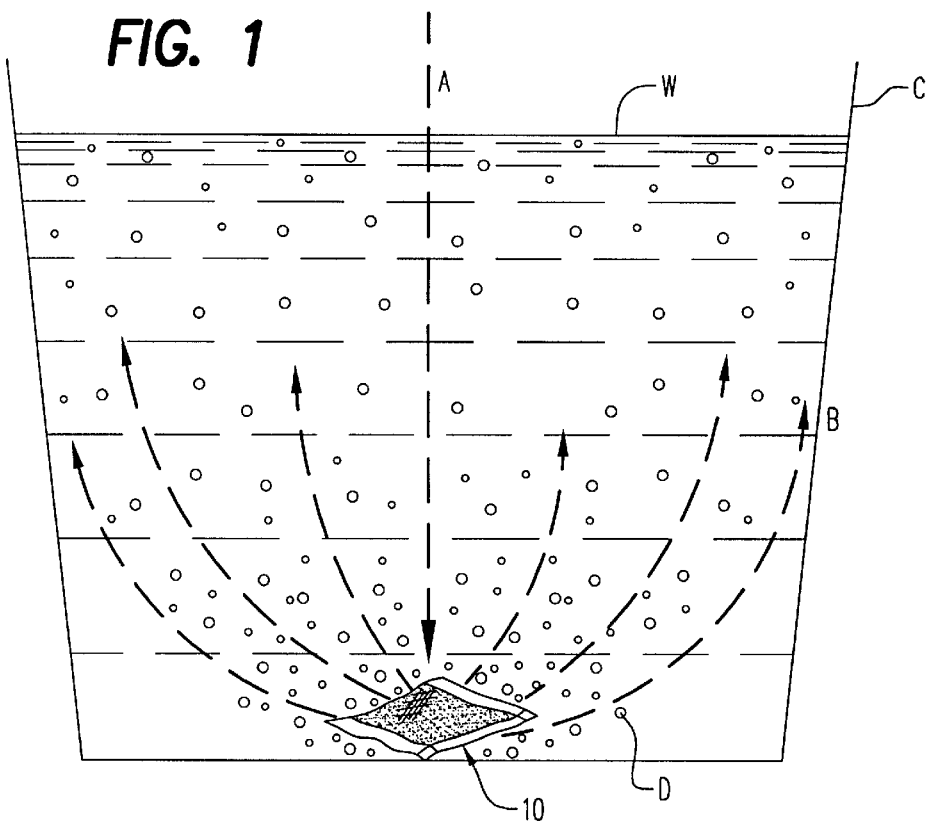
FIG. 1 is a side elevation schematic view of the invention in use within a container of contaminated water.
Figure 2:
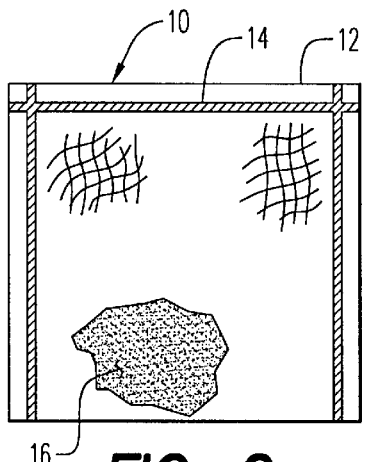
FIG. 2 is a side elevation view of the invention of FIG. 1.
Figure 3:
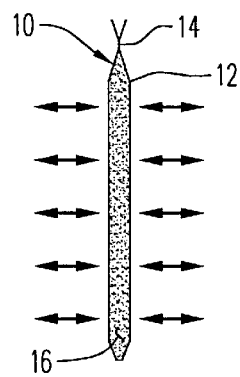
FIG. 3 is an end elevation schematic section view of FIG. 2.

Referring now to the drawings, the invention in FIGS. 1 to 3 is shown generally at numeral 10 in the form of a packet 12 which is formed of porous sheet material containing dry particles 16. The preferred range of porosity of the porous material forming the packet 12 is in the range of 0.2 to 10 microns, 5 microns being preferred. The preferred form of the porous sheet material is a synthetic plastic, preferably polyester, e.g. spinbonded polyester under the trademark REEMAY®, series 2000, #2275 or #2200. Paper filter material may also be used, although paper filter material is very hygroscopic and can prematurely absorb excess amounts of water to the detriment of the functioning of the packet as described herebelow.

The primary features of the porous sheet material forming the packet 12 as depicted in FIG. 3 are a porosity sufficient to allow water to pass into the packet 12 for oxygen to escape from the packet 12 through the porous material, and for any remaining undissolved particles 16 described herebelow to be retained within the packet 12.

A uniform mixture of dry loose particles 16 are placed within the packet 12 and then sealed therein along seal lines 14. The particles 16 represent a mixture of an alkali metal ferrate (VI) and a quantity of dry beach sand. Typically, ferrate (VI) only needs to be about 50% pure, containing other insoluble inert impurities such as iron oxide. Ferrate (VI) has a chemical formula of $FeO_4^{-2}$. The preferred form of the alkali metal cation combined with the ferrate (VI) is one that dissolves in water, namely, Li, Na, K, Rb and Cs. Potassium K is preferred for both economy and manufacturing ease and availability.

The intent of this invention is to disinfect contaminated water with oxygen O released from the packet 12. By placing one of the inventions 10 into a container C filled with contaminated water W as seen in FIG. 1, purifying and disinfecting oxygen O is released from the packet 12 in the direction of the arrows B into the contaminated water W. The presence of the dry beach sand mixed with the alkali metal ferrate (VI) within the mixture 16 insures by adequate presence of the inert insoluble sand particles that the packet 10, when dropped into the water W, will preferably sink to the bottom of the container C in the direction of arrow A in FIG. 1.

When the packet 12 is at the bottom of the container C, the oxygen O is released by the following chemical formula:

$$4K_2FeO_4 + 10H_2O \rightarrow 4Fe(OH)_2 + 3O_2\uparrow + 8KOH \quad (1)$$

The liberated oxygen is dispersed uniformly upwardly into the contaminated water W in the direction of arrows B.

The preferred source of dry ferrate (VI) is described in one of co-applicant's previous U.S. Pat. No. 4,545,974. Utilization of ferrate (VI) in its dry form is preferred due to its stability in packet form, substantially reduced cost, and the elimination of chlorinated hydrocarbons as a side product within the contaminated water. Residue left within the packet 12 after water disinfection is typically in the form of iron oxide and potassium oxide, both of which are non-toxic. However, the limited porosity of the sheet material forming the packet 12 as above described prevents this residue from entering into the now disinfected water, which residue would otherwise increase the turbidity and cloudiness thereof.

What the present invention accomplishes on an overall basis is the reduction of biological oxygen demand (B.O.D.) and chemical oxygen demand (C.O.D.). By substantially reducing these two factors present in the contaminated water, the disinfected water is ready for consumption and, when in sufficiently concentrated form as below described by example, may also serve as a wound disinfectant.

EXAMPLE 1

A mixture of 0.25 g potassium ferrate (VI) ($K_2FeO_4$) particles with 1.75 g of clean dry sand (2.0 g total) in a small tea bag approximately 1" square will disinfect five (5) gallons of contaminated water killing all bacteria contained therein. This example mixture contains sufficient inert sand to cause the packet 12 to sink to the bottom of the container C as depicted in FIG. 1 for optimal disinfecting oxygen O release.

EXAMPLE 2

A larger mixture of 7 g of potassium ferrate (VI) particles plus 93 g of clean dry sand (100 g total) uniformly mixed was prepared. Two (2) g of this dry mixture in packet form will purify one gallon of water.

EXAMPLE 3

A mixture of 0.25 g ferrate (VI) plus 1.75 g of clean dry sand in a packet 14 placed into one gallon of contaminated water will produce a disinfectant wash for wounds. TIME FACTOR When the invention is utilized in shade or unlit areas at room temperature, the disinfecting process above described will take approximately ten (10) hours. The color of the contaminated water will first turn to purple due to the presence of $Fe^{6+}$ and then to brown $Fe^{3+}$ when the oxygen release is completed. However, when the same reaction is caused to occur in sunlight, the reaction time is reduced to about 1 to 1¼ hours.

It is also here noted as shown in Example 2 above that the addition of clean dry sand also serves as an effective dilutent of the potassium ferrate (VI) so that, when mixed in larger quantities at desired proportions, smaller packet sized portions of that uniform mixture may be more accurately prepared to effect the desired controlled disinfecting of predetermined volumes of contaminated water.

Figure 4:
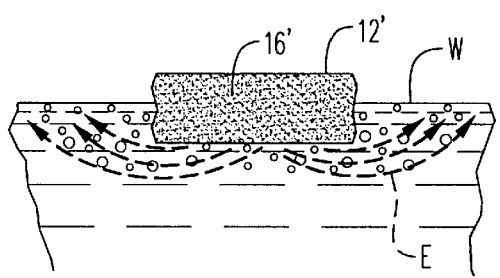
FIG. 4 is an enlarged segment in cross section of a packet similar to that of FIG. 2 having a lighter density just sufficient to submerge only a portion of the packet.

The preferred embodiment of the invention is shown generally at numeral 10 in FIGS. 1 to 3 wherein a quantity of clean dry sand or more generally inert, insoluble particles, are added in sufficient quantity to cause the packet 12 to sink to the bottom of the container C. However, as shown in FIG. 4, the dry particle mixture 16' of potassium ferrate (VI) and dry sand may include only a sufficient amount of the dry sand particles to cause the packet 12' to become partially submerged in the contaminated water W so that oxygen is liberated in the direction of arrows E at or near the surface of the contaminated water. Again, this embodiment is not preferred, but is nonetheless useful in effecting water decontamination as above described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A contaminated water disinfectant comprising:

a quantity of substantially dry soluble alkali metal ferrate (VI) particles;

a porous sealed packet containing said particles in a quantity sufficient to disinfect a predetermined quantity of contaminated water by oxygenation;

a quantity of substantially dry insoluble inert particles also contained within said packet of sufficient weight to cause said packet to at least partially sink into a container holding the contaminated water;

said packet formed of a porous sheet material capable of passing oxygen and water therethrough while preventing undissolved said ferrate and inert particles from passing therethrough.

2. A contaminated water disinfectant as set forth in claim 1, wherein:

said porous sheet has a porosity of from about 0.2 microns to about 10 microns.

3. A contaminated water disinfectant as set forth in claim 2, wherein:

said porous sheet is formed of spunbound polyester fibers.

4. A contaminated water disinfectant as set forth in claim 1, wherein:

said alkali metal is taken from the group consisting of Li, Na, K, Rb and Cs.

5. A contaminated water disinfectant as set forth in claim 1, wherein:

said inert particles are clean, dry sand.

6. A contaminated water disinfectant as set forth in claim 1, wherein:

said quantity of inert particles are sufficient in weight to cause said packet to sink to the bottom of the contaminated water.

7. A method of disinfecting a quantity of contaminated water comprising placing a packet containing a quantity of a soluble alkali metal ferrate (VI) particles into the contaminated water, said packet also containing a quantity of insoluble inert particles of sufficient weight to cause said packet to at least partially sink into the contaminated water, said packet formed of a porous sheet material capable of passing oxygen and water therethrough and of preventing undissolved said ferrate and inert particles from passing therethrough;

whereby oxygen is produced by interaction between said ferrate (VI) particles and water entering said packet, the oxygen being released from said packet into the contaminated water to effect decontamination thereof.

8. The method of claim 7, wherein:

said porous sheet has a porosity of from about 0.2 microns to about 10 microns.

9. The method of claim 8, wherein:

said porous sheet is formed of spunbound polyester fibers.

10. The method of claim 7, wherein:

said alkali metal is taken from the group consisting of Li, Na, K, Rb and Cs.

11. The method of claim 7, wherein:

said inert particles are clean, dry sand.

12. The method of claim 7, wherein:

said quantity of inert particles are sufficient in weight to cause said packet to sink to the bottom of the contaminated water.

13. In combination, a water disinfectant and a porous packet for disinfecting contaminated water comprising:

a mixture of substantially dry soluble alkali metal ferrate (VI) particles and insoluble inert particles;

a porous packet containing said mixture and formed of fibrous sheet material having a porosity sufficiently large for allowing water to enter said packet and for oxygen produced when water is combined with said ferrate particles to exit said packet, yet sufficiently small for preventing undissolved said ferrate (VI) particles and said inert particles from exiting said packet;

said mixture having a weight sufficient to cause said packet to become at least partially submerged in the contaminated water whereby water will enter said packet and come in contact with at least a portion of said ferrate (VI) particles to produce oxygen.

14. A contaminated water disinfectant as set forth in claim 13, wherein:

said porous sheet has a porosity of from about 0.2 microns to about 10 microns.

15. A contaminated water disinfectant as set forth in claim 14, wherein:

said porous sheet is formed of spunbound polyester fibers.

16. A contaminated water disinfectant as set forth in claim 13, wherein:

said alkali metal is taken from the group consisting of Li, Na, K, Rb and Cs.

17. A contaminated water disinfectant as set forth in claim 13, wherein:

said inert particles are clean, dry sand.

18. A contaminated water disinfectant as set forth in claim 13, wherein:

said quantity of inert particles are sufficient in weight to cause said packet to sink to the bottom of the contaminated water.

* * * * *